Jan. 25, 1949.                H. E. MILLS                2,459,953
                       PANEL AND FASTENER ASSEMBLY
                          Filed Feb. 3, 1944
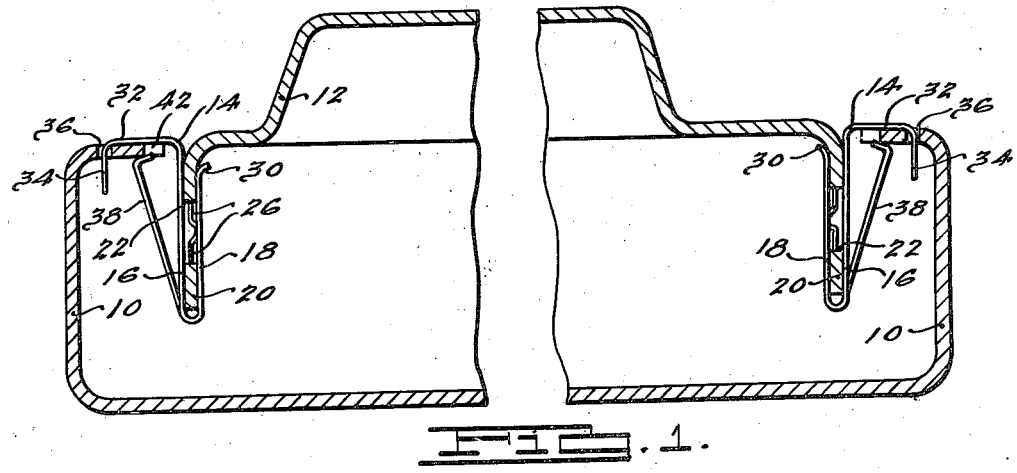
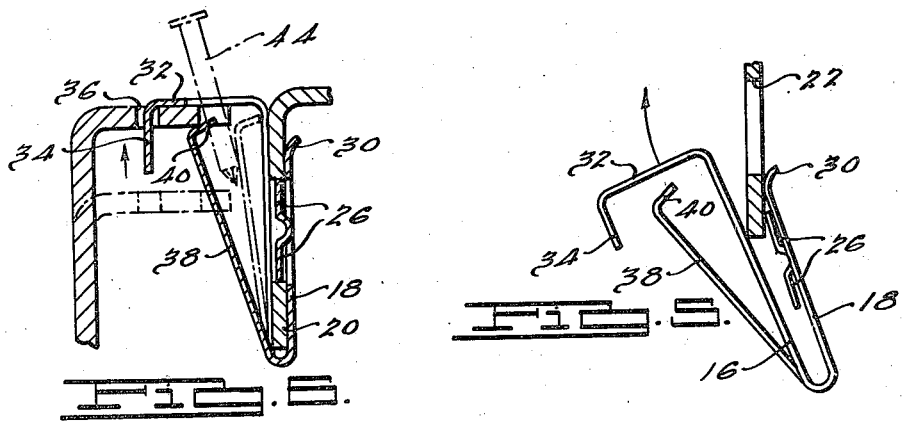
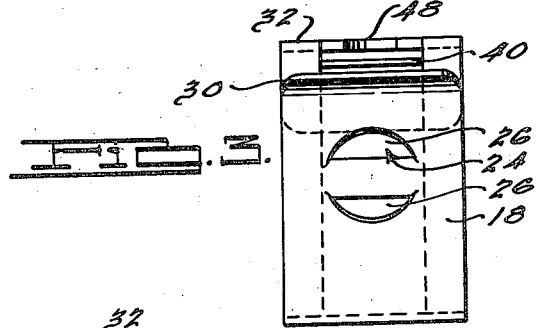
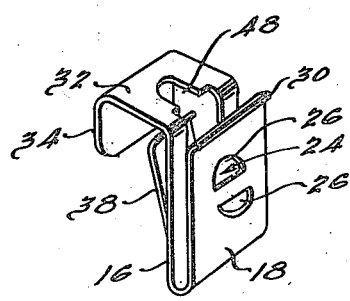
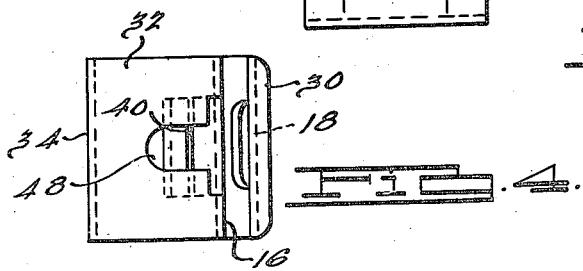
INVENTOR.
Herbert E. Mills.
BY
Edwin J. Balluff
ATTORNEY.

Patented Jan. 25, 1949

2,459,953

UNITED STATES PATENT OFFICE 2,459,953

PANEL AND FASTENER ASSEMBLY

Herbert E. Mills, Detroit, Mich., assignor, by mesne assignments, to Mills Engineering Company, Detroit, Mich., a partnership Application February 3, 1944, Serial No. 520,993

4 Claims. (Cl. 189—35)

This invention relates to a panel and fastener assembly and has particular reference to an assembly of sheet metal panels in which the panels are secured together by a threadless fastening device.

The principal object of the invention is to provide a new and improved assembly of sheet metal panels and threadless fastener means therefor.

This invention contemplates a new assembly of sheet metal panels and the like in which the same are secured together by a threadless fastening means, thereby reducing materially the time and effort heretofore involved in forming such assemblies. The assemblies embodying the invention have particular application on various sheet metal constructions, such as stoves, refrigerators, cabinets, and the like.

For a further and more detailed explanation of the invention, reference may be had to the accompanying drawings of which there is one sheet and wherein:

Fig. 1 is a sectional view of a sheet metal panel assembly, such as a door, embodying the invention;

Fig. 2 is a perspective view of the threadless fastener which forms a part of the assembly;

Figs. 3 and 4 are side elevational and plan views, respectively, of the threadless fastener;

Fig. 5 is a view illustrating the method of assembling the fastener to the flange of a sheet metal panel; and Fig. 6 is a view of the assembly illustrating the method of separating one of the panels from the assembly.

An assembly embodying the invention may comprise a pair of sheet metal panels 10 and 12 and a plurality of threadless fasteners 14. The assembly partially illustrated in Fig. 1 may comprise a door in which the panel 10 may form the exterior thereof and the panel 12 the interior thereof. Fig. 1 may represent a cross section anywhere through the assembly, and it is contemplated that such numbers of fasteners 14 are employed as may be necessary to hold the parts in operative relationship.

The threadless fastener 14 comprises a U-shaped clip of spring metal having spaced leg portions 16 and 18. A sheet metal-like piece or flange thereof, such as the flange 20 of the panel 12, is adapted to be accommodated between such leg portions. The flange 20 is provided with a seat 22 which as illustrated is formed by a circular hole extending therethrough. The leg portions 16 and 18 preferably are formed integrally from a single piece of stock. The leg portion 18 is provided with an integral offset or projection indicated generally at 24, and as illustrated such offset or projection comprises a pair of semicircular members 26 having their curved edges presented away from each other. The members 24 preferably are arranged in a plane offset from the plane of the leg portion 18 toward the leg portion 16. Such offset or projection is adapted to be seated within the seat 22 formed in the flange 20.

The interengageable surfaces of the projection 24 and the seat 22 are disposed relative to each other so that tension in any direction parallel to and in the planes of said leg portion 18 and said flange 20 will not tend to disengage the projection 24 from its seat 22. The projection 24 is held in operative engagement with said seat by the spring pressure of the leg portions 16 and 18 of the clip. Such projection 24 is separable from the flange by moving the leg portion 18 having such projection thereon away from the flange 20. In order to facilitate the penetration of the flange 20 into the space between the leg portions 16 and 18 the upper edge 30 of the leg portion 18 may be flared outwardly. Preferably the space between the leg portions 16 and 18 is such as to snugly accommodate the flange 20.

The leg portion 16 is provided with a laterally extending flange 32 which is bent back at 34 generally parallel with the portion 16. The bent-back portion 34 forms a tab or hook to project in a slot or hole 36 formed in the other panel 10 so as to prevent any substantial shifting of the same relative to the fastener 14. The hole 36 in the panel 10, it will be observed, is arranged in a portion thereof which is generally parallel to the flange 32 of the fastener. A prong or tongue 38 struck out of the leg portion 16 and provided with a tab 40 on the end thereof is adapted to engage the side of the panel 10 adjacent the edge thereof so as to hold such edge of the panel 10 against the flange 32 of the fastener. The edge of the panel 10 preferably is provided with a notch 42 adjacent the tab 40 so that a pointed tool, such as that indicated at 44, may be maneuvered so as to engage the tab 40 and to deflect the prong 38 sufficient so as to permit the panel 10 to be separated from the hook 34 of the fastener.

This action is indicated in Fig. 6 where the prong 38 is illustrated in dotted lines in a position which will permit the flange of the panel 10 to be separated from the hook 34 by moving such flange downwardly off the end of the hook. It will be observed that the edge of the flange of the panel 10 terminates in such spaced relation to the leg portion 16 so as to clear the prong 38 when it is positioned as indicated in dotted lines. The flange 32 is provided with a slot 48 into which the tool 44 may be inserted.

This application forms a continuation in part of my prior copending application Serial Number 424,217, filed December 24, 1941, for "Threadless fastening device," now Patent No. 2,369,480, issued February 13, 1945.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. A panel and fastener assembly comprising a pair of sheet metal panels, and a threadless fastener, a part of one of said panels being arranged normal to a part of the other of said panels and spaced from the edge thereof, said part of said other of said panels being provided with an aperture forming a seat, said part of said one of said panels being provided with a hole therein, said fastener comprising a U-shaped clip of spring metal having spaced leg portions connected at one end and adapted to accommodate between said leg portions said part of said other of said panels, one of said leg portions of said clip having an integral offset projecting toward the other of said leg portions and engageable with said seat for securing said fastener against separation from said panel on which said seat is provided, said offset having circumjacent edges lying in a plane substantially parallel to said leg portions, said leg portions functioning due to the spring pressure of said clip to hold said offset in engagement with said seat, even though tension, in any direction parallel to and in the plane of said leg portions and said part of said other panel, is exerted on said clip and said part of said other panel to pull them apart, and means provided on one of said leg portions by means of which said fastener is secured to said part of said one of said panels, said means comprising a laterally extending flange and a prong positioned to receive said part of said one of said panels therebetween, and a hook extending into said hole for holding said part of said one of said panels between said flange and prong.

2. A panel and fastener assembly comprising a pair of sheet metal panels, and a threadless fastener, a part of one of said panels being arranged normal to a part of the other of said panels and spaced from the edge thereof, said part of said other of said panels being provided with a seat between said edge and said part of said one of said panels, said part of said one of said panels being provided with a hole therein in spaced relation with the edge thereof, said fastener comprising a U-shaped clip of spring metal having spaced leg portions connected at one end and adapted to accommodate between said leg portions said part of said other of said panels, one of said leg portions of said clip having an integral offset projecting toward the other of said leg portions and engageable with said seat for securing said fastener against separation from said panel on which said seat is provided, said leg portions functioning due to the spring pressure of said clip to hold said offset in engagement with said seat, even though tension, in any direction parallel to and in the plane of said leg portions and said part of said other panel, is exerted on said clip and said part of said other panel to pull them apart, and means provided on one of said leg portions by means of which said fastener is secured to said part of said one of said panels, said means comprising a laterally extending flange and a prong positioned to receive said part of said one of said panels therebetween, said flange having a hook extending into said hole for holding said part of said one of said panels between said flange and prong.

3. A panel and fastener assembly comprising a pair of sheet metal panels, and a threadless fastener, a part of one of said panels being arranged normal to a part of the other of said panels and spaced from the edge thereof, said part of said other of said panels being provided with a seat between said edge and said part of said one of said panels, said part of said one of said panels being provided with a hole therein in spaced relation with the edge thereof, said fastener comprising a U-shaped clip of spring metal having spacing leg portions connected at one end and adapted to accommodate between said leg portions said part of said other of said panels, one of said leg portions of said clip having an integral offset projecting toward the other of said leg portions and engageable with said seat for securing said fastener against separation from said panel on which said seat is provided, said leg portions functioning due to the spring pressure of said clip to hold said offset in engagement with said seat, even though tension, in any direction parallel to and in the plane of said leg portions and said part of said other panel, is exerted on said clip and said part of said other panel to pull them apart, and means provided on the other of said leg portions by means of which said fastener is secured to said part of said one of said panels, said means comprising a laterally extending flange and a prong adapted to receive said part of said one of said panels therebetween, said prong having a tab on the end thereof and an opening in said flange affording access for a tool to said tab, said flange having a hook extending into said hole.

4. A threadless fastener for sheet metal panels and the like comprising a U-shaped clip of spring metal having spaced leg portions connected at one end, one of said leg portions of said clip having an integral offset projecting toward the other of said leg portions and forming a means for securing said fastener to a flange or edge of a panel having a hole therein, said offset having circumjacent edges lying in a plane substantially parallel to said leg portions, and means provided on one of said leg portions by means of which said fastener is secured to a flange or edge of another panel, said last-mentioned means comprising a laterally extending flange, a prong positioned relative to said flange and cooperating therewith to receive the edge of a panel therebetween and a hook cooperable with a hole in said panel for holding such panel between said flange and prong.

HERBERT E. MILLS.

REFERENCES CITED

The following references are of record in the file of this patent:

UNITED STATES PATENTS

| Number | Name | Date |
| --- | --- | --- |
| 800,361 | Corper | Sept. 26, 1905 |
| 1,744,196 | Ames | Jan. 21, 1930 |
| 2,127,234 | Reiter | Aug. 16, 1938 |
| 2,154,712 | Van Uum | Apr. 18, 1939 |
| 2,171,350 | Anderson | Aug. 29, 1939 |
| 2,317,015 | Allen | Apr. 20, 1943 |
| 2,369,480 | Mills | Feb. 13, 1945 |

FOREIGN PATENTS

| Number | Country | Date |
| --- | --- | --- |
| 775,049 | France | Oct. 1, 1934 |